US011901635B2

(12) United States Patent
Yoon et al.

(10) Patent No.: US 11,901,635 B2
(45) Date of Patent: Feb. 13, 2024

(54) THREE DIMENSIONAL ANTENNA ARRAY MODULE

(71) Applicant: Movandi Corporation, Irvine, CA (US)

(72) Inventors: Seunghwan Yoon, Irvine, CA (US); Franco De Flaviis, Irvine, CA (US); Alfred Grau Besoli, Irvine, CA (US); Kartik Sridharan, San Diego, CA (US); Ahmadreza Rofougaran, Newport Beach, CA (US); Michael Boers, South Turramurra (AU); Sam Gharavi, Irvine, CA (US); Donghyup Shin, Irvine, CA (US); Farid Shirinfar, Granada Hills, CA (US); Stephen Wu, Fountain Valley, CA (US); Maryam Rofougaran, Rancho Palos Verdes, CA (US)

(73) Assignee: MOVANDI CORPORATION, Irvine, CA (US)

( * ) Notice: Subject to any disclaimer, the term of this patent is extended or adjusted under 35 U.S.C. 154(b) by 0 days.

(21) Appl. No.: 17/898,706

(22) Filed: Aug. 30, 2022

(65) Prior Publication Data

US 2022/0416442 A1 Dec. 29, 2022

Related U.S. Application Data

(60) Continuation of application No. 17/004,373, filed on Aug. 27, 2020, now Pat. No. 11,509,066, which is a (Continued)

(51) Int. Cl.
*H01Q 21/00* (2006.01)
*H01Q 21/06* (2006.01)
(Continued)

(52) U.S. Cl.
CPC ......... *H01Q 21/065* (2013.01); *H01Q 1/2283* (2013.01); *H01Q 9/045* (2013.01); *H01Q 21/0025* (2013.01)

(58) Field of Classification Search
CPC ............. H01Q 1/22–38; H01Q 21/065; H01Q 21/0025; H01Q 1/2283; H01L 2223/6677
See application file for complete search history.

(56) References Cited

U.S. PATENT DOCUMENTS 5,724,337 A 3/1998 Kawano et al.
7,079,079 B2 * 7/2006 Jo ........................ H01Q 9/0421 343/702

(Continued)

OTHER PUBLICATIONS

Corrected Notice of Allowance for U.S. Appl. No. 16/927,225 dated Feb. 1, 2023.

(Continued)

*Primary Examiner* — Hasan Islam
(74) *Attorney, Agent, or Firm* — CHIP LAW GROUP

(57) ABSTRACT

An apparatus includes a plurality of antenna modules and a printed circuit board (PCB) having a plurality of holes embedded with a heat sink. Each antenna module includes an antenna substrate, a plurality of three-dimensional (3-D) antenna cells mounted on a first surface of the antenna substrate, and a plurality of packaged circuitry mounted on a second surface of the antenna substrate. The plurality of packaged circuitry are electrically connected with the plurality of 3-D antenna cells. Each of the plurality of antenna modules is mounted on a plurality of portions of the heat sink such that a corresponding packaged circuitry of the plurality of packaged circuitry is in a direct contact with the plurality of portions of the heat sink embedded within the plurality of holes.

20 Claims, 6 Drawing Sheets

Related U.S. Application Data division of application No. 15/607,750, filed on May 30, 2017, now Pat. No. 10,916,861.

(51) Int. Cl.
*H01Q 1/22* (2006.01)
*H01Q 9/04* (2006.01)

(56) References Cited

U.S. PATENT DOCUMENTS 7,363,058 B2 4/2008 Gustaf
7,675,465 B2* 3/2010 Doan .................. H05K 1/0204 343/700 MS
7,679,576 B2 3/2010 Riedel et al.
9,130,262 B2* 9/2015 Park .................... H01Q 9/0442
9,178,546 B1 11/2015 Klemes
9,252,908 B1 2/2016 Branlund
10,080,274 B2 9/2018 Johnson
10,199,717 B2 2/2019 Rofougaran et al.
10,389,041 B2 8/2019 Yoon et al.
10,854,995 B2 12/2020 Rofougaran et al.
10,965,411 B2 3/2021 Moshfeghi
11,018,816 B2 5/2021 Moshfeghi
11,056,764 B2 7/2021 Rofougaran et al.
11,075,724 B2 7/2021 Moshfeghi
11,088,756 B2 8/2021 Gharavi et al.
11,128,415 B2 9/2021 Moshfeghi
11,342,968 B2 5/2022 Yoon et al.
11,394,128 B2 7/2022 Rofougaran et al.
11,637,664 B2 4/2023 Moshfeghi
11,652,584 B2 5/2023 Moshfeghi
2004/0204114 A1 10/2004 Brennan et al.
2005/0134517 A1 6/2005 Gottl
2006/0040615 A1 2/2006 Mohamadi
2006/0063487 A1 3/2006 Cleveland et al.
2006/0170595 A1* 8/2006 Gustaf .............. H04W 72/0453 343/700 MS
2007/0001924 A1 1/2007 Hirabayashi
2008/0207259 A1 8/2008 Rofougaran
2009/0046624 A1 2/2009 Martinez et al.
2009/0066590 A1 3/2009 Yamada et al.
2009/0156227 A1 6/2009 Frerking et al.
2009/0197538 A1 8/2009 Borran et al.
2010/0159859 A1 6/2010 Rofougaran
2010/0284446 A1 11/2010 Mu et al.
2011/0109507 A1 5/2011 Warnick
2011/0159801 A1 6/2011 Maltsev et al.
2011/0190005 A1 8/2011 Cheon et al.
2012/0026998 A1 2/2012 O'Keeffe et al.
2012/0149300 A1 6/2012 Forster
2012/0320874 A1 12/2012 Li et al.
2013/0034128 A1 2/2013 Gore et al.
2013/0122802 A1 5/2013 Wang et al.
2013/0341128 A1 12/2013 Jordan et al.
2014/0104124 A1 4/2014 Chernokalov et al.
2015/0340765 A1* 11/2015 Dang .................. H01Q 1/2208 343/893
2016/0049723 A1* 2/2016 Baks ....................... H01L 23/66 343/848
2016/0204513 A1 7/2016 Yemelong et al.
2016/0359230 A1 12/2016 Wang et al.
2017/0324171 A1 11/2017 Shehan
2017/0353338 A1 12/2017 Amadjikpe et al.
2018/0063139 A1 3/2018 Day et al.
2018/0191053 A1 7/2018 Ndip et al.
2018/0191062 A1* 7/2018 Ndip ........................ H01Q 1/38
2018/0231651 A1 8/2018 Charvat
2018/0269576 A1 9/2018 Scarborough et al.
2018/0316090 A1 11/2018 Foo
2019/0020399 A1 1/2019 Coutts
2019/0020407 A1 1/2019 Gharavi et al.
2019/0230626 A1 7/2019 Rune et al.
2019/0334253 A1 10/2019 Corman et al.
2020/0185299 A1* 6/2020 Chang ..................... H01L 23/13
2021/0058140 A1 2/2021 Schwab et al.
2021/0203085 A1 7/2021 Jordan et al.

OTHER PUBLICATIONS

Corrected Notice of Allowance for U.S. Appl. No. 17/209,030 dated Feb. 15, 2023.
Corrected Notice of Allowance for U.S. Appl. No. 17/230,696 dated Mar. 1, 2023.
Corrected Notice of Allowance for U.S. Appl. No. 17/365,037 dated Jan. 5, 2023.
Corrected Notice of Allowance for U.S. Appl. No. 17/742,648 dated Feb. 1, 2023.
Corrected Notice of Allowance for U.S. Appl. No. 17/863,874 dated Feb. 13, 2023.
Corrected Notice of Allowance for U.S. Appl. No. 17/863,874 dated Feb. 24, 2023.
Supplemental Notice of Allowance for U.S. Appl. No. 17/230,566 dated Jan. 5, 2023.
Final Office Action for U.S. Appl. No. 17/377,983 dated Feb. 10, 2023.
Non-Final Office Action for U.S. Appl. No. 17/887,672 dated Dec. 6, 2022.
Non-Final Office Action for U.S. Appl. No. 17/011,042 dated Feb. 3, 2023.
Non-Final Office Action for U.S. Appl. No. 17/396,063 dated Jan. 18, 2023.
Non-Final Office Action for U.S. Appl. No. 17/903,092 dated Feb. 16, 2023.
Non-Final Office Action for U.S. Appl. No. 17/903,130 dated Feb. 27, 2023.
Notice of Allowability for U.S. Appl. No. 17/230,566 dated Feb. 2, 2023.
Notice of Allowability for U.S. Appl. No. 17/243,747 dated Dec. 2, 2022.
Notice of Allowability for U.S. Appl. No. 17/243,747 dated Jan. 5, 2023.
Notice of Allowance for U.S. Appl. No. 17/209,030 dated Feb. 8, 2023.
Notice of Allowance for U.S. Appl. No. 17/230,696 dated Jan. 20, 2023.
Notice of Allowance for U.S. Appl. No. 17/382,398 dated Feb. 28, 2023.
Notice of Allowance for U.S. Appl. No. 17/408,583 dated Feb. 27, 2023.
Notice of Allowance for U.S. Appl. No. 17/408,606 dated Feb. 1, 2023.
Notice of Allowance for U.S. Appl. No. 17/536,235 dated Feb. 15, 2023.
Notice of Allowance for U.S. Appl. No. 17/742,648 dated Jan. 25, 2023.
Notice of Allowance for U.S. Appl. No. 17/946,734 dated Jan. 30, 2023.
Supplemental Notice of Allowance for U.S. Appl. No. 17/208,984 dated Jan. 5, 2023.
Corrected Notice of Allowance for U.S. Appl. No. 16/927,225 dated Nov. 23, 2022.
Corrected Notice of Allowance for U.S. Appl. No. 16/935,422 dated Oct. 17, 2022.
Corrected Notice of Allowance for U.S. Appl. No. 16/935,422 dated Sep. 14, 2022.
Corrected Notice of Allowance for U.S. Appl. No. 16/935,515 dated Oct. 17, 2022.
Corrected Notice of Allowance for U.S. Appl. No. 16/935,515 dated Sep. 14, 2022.
Corrected Notice of Allowance for U.S. Appl. No. 17/329,276 dated Nov. 23, 2022.
Corrected Notice of Allowance for U.S. Appl. No. 17/329,276 dated Oct. 11, 2022.
Corrected Notice of Allowance for U.S. Appl. No. 17/337,529 dated Nov. 10, 2022.

(56) References Cited

OTHER PUBLICATIONS

Corrected Notice of Allowance for U.S. Appl. No. 17/337,529 dated Oct. 5, 2022.
Corrected Notice of Allowance for U.S. Appl. No. 17/365,037 dated Nov. 15, 2022.
Corrected Notice of Allowance for U.S. Appl. No. 17/365,037 dated Nov. 25, 2022.
Corrected Notice of Allowance for U.S. Appl. No. 17/208,984 dated Nov. 23, 2022.
Final Office Action for U.S. Appl. No. 17/011,042 dated Oct. 7, 2022.
Non-Final Office Action for U.S. Appl. No. 17/209,030 dated Oct. 14, 2022.
Non-Final Office Action for U.S. Appl. No. 17/230,696 dated Oct. 6, 2022.
Non-Final Office Action for U.S. Appl. No. 17/377,983 dated Oct. 26, 2022.
Non-Final Office Action for U.S. Appl. No. 17/382,398 dated Oct. 19, 2022.
Non-Final Office Action for U.S. Appl. No. 17/408,583 dated Nov. 4, 2022.
Non-Final Office Action for U.S. Appl. No. 17/536,235 dated Oct. 11, 2022.
Non-Final Office Action for U.S. Appl. No. 17/742,648 dated Oct. 5, 2022.
Notice of Allowability for U.S. Appl. No. 17/004,373 dated Aug. 31, 2022.
Notice of Allowability for U.S. Appl. No. 17/004,373 dated Oct. 24, 2022.
Notice of Allowability for U.S. Appl. No. 17/060,182 dated Oct. 20, 2022.
Notice of Allowability for U.S. Appl. No. 17/060,182 dated Sep. 20, 2022.
Notice of Allowance for U.S. Appl. No. 16/927,225 dated Oct. 3, 2022.
Notice of Allowance for U.S. Appl. No. 17/243,747 dated Sep. 27, 2022.
Notice of Allowance for U.S. Appl. No. 17/863,874 dated Nov. 18, 2022.
Supplemental Notice of Allowability for U.S. Appl. No. 17/208,984 dated Nov. 10, 2022.
Corrected Notice of Allowability for U.S. Appl. No. 17/382,398 dated Mar. 13, 2023.
Final Office Action for U.S. Appl. No. 17/011,042 dated May 12, 2023.
Final Office Action for U.S. Appl. No. 17/887,672 dated Mar. 30, 2023.
Notice of Allowance for U.S. Appl. No. 17/208,893 dated Mar. 8, 2023.
Notice of Allowance for U.S. Appl. No. 17/377,983 dated Apr. 19, 2023.
Notice of Allowance for U.S. Appl. No. 17/396,063 dated May 26, 2023.
Notice of Allowance for U.S. Appl. No. 17/978,565 dated Mar. 17, 2023.
Supplemental Notice of Allowance for U.S. Appl. No. 17/243,747 dated Mar. 7, 2023.
Non-Final Office Action for U.S. Appl. No. 17/011,042 dated Sep. 15, 2023.
Non-Final Office Action for U.S. Appl. No. 17/903,092 dated Sep. 14, 2023.
Non-Final Office Action for U.S. Appl. No. 17/943,300 dated Sep. 27, 2023.
Notice of Allowance for U.S. Appl. No. 17/887,672 dated Oct. 17, 2023.
Final Office Action for U.S. Appl. No. 17/903,092 dated Jun. 8, 2023.
Non-Final Office Action for U.S. Appl. No. 17/887,672 dated Jul. 10, 2023.
Non-Final Office Action for U.S. Appl. No. 17/988,827 dated Jun. 22, 2023.
Non-Final Office Action for U.S. Appl. No. 18/083,756 dated Jun. 21, 2023.
Non-Final Office Action for U.S. Appl. No. 18/175,408 dated Jun. 16, 2023.
Final Office Action for U.S. Appl. No. 17/903,130 dated Nov. 9, 2023.
Notice of Allowance for U.S. Appl. No. 18/083,756 dated Nov. 14, 2023.

* cited by examiner

THREE DIMENSIONAL ANTENNA ARRAY MODULE

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 17/004,373, filed on Aug. 27, 2020, which claims priority to, and is a Divisional Application of U.S. patent application Ser. No. 15/607,750, filed May 30, 2017.

This Application also makes reference to U.S. Pat. No. 10,062,965, which was filed on Apr. 14, 2017.

The above referenced Applications are hereby incorporated herein by reference in their entirety.

FIELD OF TECHNOLOGY

Certain embodiments of the disclosure relate to an antenna module. More specifically, certain embodiments of the disclosure relate to a three-dimensional (3-D) antenna cells for antenna modules.

BACKGROUND

Current decade is witnessing a rapid growth and evolvement in the field of wireless communication. For instance, in 5G wireless communication, advanced antennas and radar systems (such as phased antenna array modules) are utilized for beam forming by phase shifting and amplitude control techniques, without a physical change in direction or orientation and further, without a need for mechanical parts to effect such changes in direction or orientation.

Typically, a phased antenna array module includes a substrate and a radio frequency (RF) antenna cell provided in relation to the substrate. To design a radio frequency frontend (RFFE), for every phased antenna array module, a designer may also be required to purchase and integrate various semiconductor chips in order to realize their design objectives. The designer may also be required to consider other factors, such as the design of the antenna, various connections, transitions from the antenna cell to the semiconductor chips and the like, which may me quite complex, tedious, and time consuming. Further, impaired antenna impedance matching during scanning or beam forming results in increased return loss (defined as ratio of power returned from an antenna to power delivered to the antenna). Also, the choice of substrate materials is important as thicker substrates are more expensive and may behave as waveguides, adversely affecting radiation of RF waves from the antennas, and resulting in increased loss and lower efficiency. Thus, there is a need for a highly efficient antenna array module with a flexible design for RFFE (in the wireless communication systems) that overcomes the deficiencies in the art.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Three-dimensional (3-D) antenna array module for use in RF communication system, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a 3-D antenna array module for use in RF communication system. In the following description, reference is made to the accompanying drawings, which form a part hereof, and in which is shown, by way of illustration, various embodiments of the present disclosure.

Figure 1:
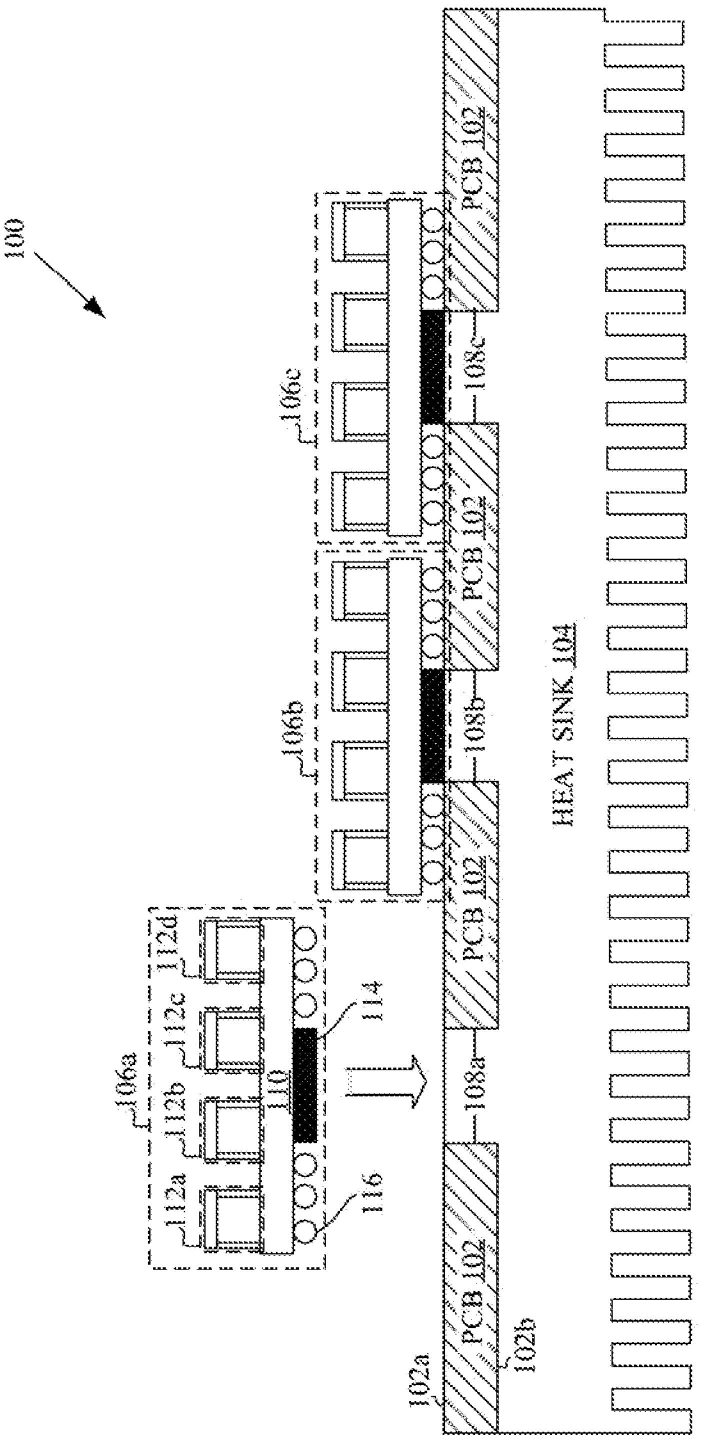
FIG. 1 is an exemplary arrangement of 3-D antenna array modules on a printed circuit board (PCB), in accordance with an exemplary embodiment of the disclosure.

FIG. 1 is an exemplary arrangement of 3-D antenna array modules on a PCB, in accordance with an exemplary embodiment of the disclosure. With reference to FIG. 1, there is shown an exemplary arrangement diagram 100. The exemplary arrangement diagram 100 corresponds to integration of a plurality of antenna modules 106 (for example, a first antenna module 106*a*, a second antenna module 106*b*, and a third antenna module 106*c*) on a PCB 102. The PCB 102 may have a top PCB surface 102*a* and a bottom PCB surface 102*b*. There is further shown a plurality of holes 108, for example, a first gap or hole 108*a*, a second gap or hole 108*b*, and a third gap 108*c* that are included in the PCB 102. There is further shown a heat sink 104 in direct contact with the bottom PCB surface 102*b* and further embedded within the plurality of holes 108. With reference to the plurality of antenna modules 106, for example, the first antenna module 106*a*, there is shown an antenna substrate 110, a plurality of 3-D antenna cells 112 (for example, a first antenna cell 112*a*, a second antenna cell 112*b*, a third antenna cell 112*c*, and a fourth antenna cell 112*d*), a plurality of packaged circuitry 114, and a plurality of supporting balls 116.

In accordance with an embodiment, the heat sink 104 may be in direct contact with the bottom PCB surface 102*b* of the PCB 102, as shown in FIG. 1. Further, the plurality of holes 108 included in the PCB 102 may be embedded with the heat sink 104. The heat sink 104 embedded within the plurality of holes 108 of the PCB 102 may dissipate heat generated by, for example, the plurality of 3-D antenna cells 112, the plurality of packaged circuitry 114, one or more power amplifiers (not shown), and other heat generating circuitry or components associated with the plurality of antenna modules 106 and the PCB 102. With such arrangement, the top PCB surface 102*a* of the PCB 102 and the plurality of portions of the heat sink 104 embedded within the plurality of holes 108 forms a mounting surface of the PCB 102 on which the plurality of antenna modules 106 may be mounted.

The plurality of antenna modules 106, for example, the first antenna module 106*a*, may be obtained based on integration of the plurality of 3-D antenna cells 112, the plurality of packaged circuitry 114, and the plurality of supporting balls 116 on the antenna substrate 110. The antenna substrate 110 may be composed of a low loss substrate material. The low loss substrate material may exhibit characteristics, such as low loss tangent, high adhesion strength, high insulation reliability, low roughness, and/or the like.

In accordance with an exemplary embodiment, the plurality of 3-D antenna cells 112 may be integrated on a first surface of the antenna substrate 110. In accordance with an embodiment, each of the plurality of 3-D antenna cells 112 may correspond to a plurality of small packages mounted on an antenna module, for example, the first antenna module 106*a*. In accordance with another embodiment, each of the plurality of 3-D antenna cells 112 may correspond to a 3-D metal stamped antenna, which provide high efficiency at a relatively low cost. A structure of a 3-D antenna cell has been described in detail in FIG. 2.

Further, the plurality of packaged circuitry 114 may be integrated on a second surface of the antenna substrate 110, as shown. Each of the plurality of packaged circuitry 114 in the first antenna module 106*a* may comprise suitable logic, circuitry, interfaces, and/or code that may be configured to execute a set of instructions stored in a memory (not shown) to execute one or more (real-time or non-real-time) operations. The plurality of packaged circuitry 114 may further comprise a plurality of RF chips and at least one mixer chip. The plurality of RF chips and the at least one mixer chip in the plurality of packaged circuitry 114 may be integrated on the second surface of the antenna substrate 110. Further, the plurality of packaged circuitry 114 may be connected through an electromagnetic transmission line with the plurality of 3-D antenna cells 112.

Further, the plurality of supporting balls 116 may be integrated on the second surface of the antenna substrate 110, as shown. The plurality of supporting balls 116 may be integrated to provide uniform spacing between the first antenna module 106*a* and the PCB 102. Furthermore, the plurality of supporting balls 116 may be integrated to provide uniform support to the first antenna module 106*a* on the PCB 102. Each of the plurality of supporting balls 116 may be composed of materials, such as, but not limited to, an insulating material, a non-insulating material, a conductive material, a non-conductive material, or a combination thereof.

Based on at least the above integration of the plurality of 3-D antenna cells 112, the plurality of packaged circuitry 114, and the plurality of supporting balls 116 on the antenna substrate 110, the first antenna module 106*a* may be obtained. Similar to the first antenna module 106*a*, the second antenna module 106*b* and the third antenna module 106*c* may be obtained, without deviation from the scope of the disclosure.

Further, in accordance with an embodiment, each of the plurality of antenna modules 106 may be mounted on the plurality of portions of the heat sink 104 embedded within the plurality of holes 108 that forms the mounting surface of the PCB 102. The plurality of antenna modules 106 may be mounted on the plurality of portions in such a manner that the corresponding packaged circuitry is in direct contact with portions of the heat sink 104 embedded within the plurality of holes 108 to realize a 3-D antenna panel. In an exemplary implementation, the 3-D antenna panel comprising 3-D antenna cells, for example, the plurality of antenna cells 112, may be used in conjunction with 5G wireless communications (5th generation mobile networks or 5th generation wireless systems). In another exemplary implementation, the 3-D antenna panel comprising the 3-D antenna cells may be used in conjunction with commercial radar systems and geostationary communication satellites or low earth orbit satellites.

Figure 2:
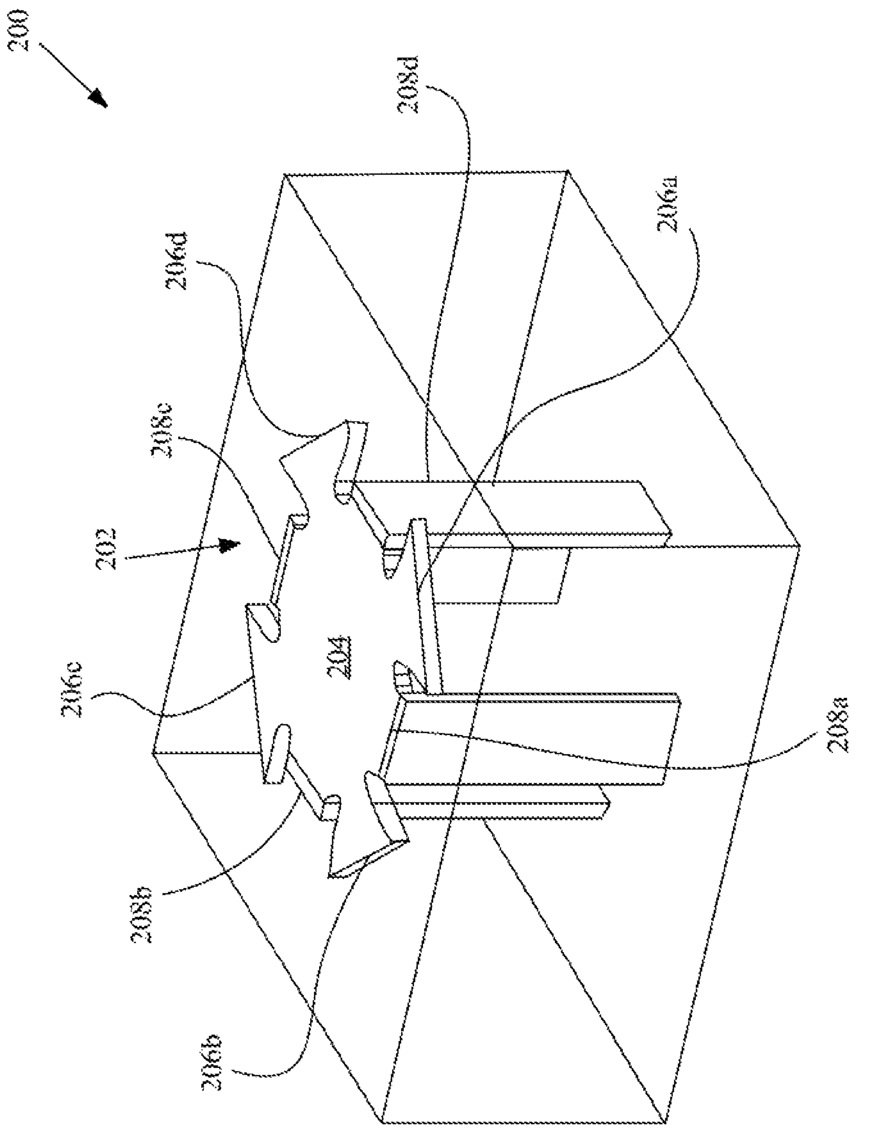
FIG. 2 illustrates a perspective view of an antenna cell of a 3-D antenna array module, in accordance with an exemplary embodiment of the disclosure.

FIG. 2 illustrates a perspective view of an exemplary antenna cell of a 3-D antenna array module, in accordance with an exemplary embodiment of the disclosure. With reference to FIG. 2, there is shown a 3-D antenna cell 200 as one of the antenna cells associated with each of the plurality of antenna modules 106. For example, the 3-D antenna cell 200 may correspond to one of the plurality of antenna cells 112, such as the first antenna cell 112*a*, the second antenna cell 112*b*, the third antenna cell 112*c*, or the fourth antenna cell 112*d* of the first antenna module 106*a*. With reference to the 3-D antenna cell 200, there is shown a raised antenna patch 202, having a top plate 204 with projections 206*a*, 206*b*, 206*c*, and 206*d*, and supporting legs 208*a*, 208*b*, 208*c*, and 208*d*.

In accordance with an embodiment, the 3-D antenna cell 200 may correspond to a 3-D metal stamped antenna for use in a wireless communication network, such as 5G wireless communications. The wireless communication network may facilitate extremely high frequency (EHF), which is the band of radio frequencies in the electromagnetic spectrum from 30 to 300 gigahertz. Such radio frequencies have wavelengths from ten to one millimeter, referred to as millimeterwave (mmWave). In such a scenario, a height of the 3-D antenna cell 200 may correspond to one-fourth of the mmWave. Further, a width of the 3-D antenna cell 200 may correspond to half of the mmWave. Further, a distance between two antenna cells may correspond to half of the mmWave.

Further, the four projections 206*a*, 206*b*, 206*c*, and 206*d* of the raised antenna patch 202 may be situated between a pair of adjacent supporting legs of the four supporting legs 208*a*, 208*b*, 208*c*, and 208*d*. The four projections 206*a*, 206*b*, 206*c*, and 206*d* may have outwardly increasing widths i.e., a width an inner portion of each of the four projections 206*a*, 206*b*, 206*c*, and 206*d* is less than a width of an outer portion of each of the four projections 206*a*, 206*b*, 206*c*, and 206*d*. Further, the width of each of the four projections 206*a*, 206*b*, 206*c*, and 206*d* gradually increases while moving outward from the inner portion towards the outer portion.

Further, the four supporting legs 208*a*, 208*b*, 208*c*, and 208*d* of the raised antenna patch 202 may be situated between a pair of adjacent projections of the four projections 206*a*, 206*b*, 206*c*, and 206*d*. For example, supporting leg 208*a* is situated between the adjacent projections 206*a* and 206*b*. The four supporting legs 208*a*, 208*b*, 208*c*, and 208*d* extend from top plate 204 of the raised antenna patch 202. Based on the usage of the four supporting legs 208*a*, 208*b*, 208*c*, and 208*d* in the 3-D antenna cell, the four supporting legs 208*a*, 208*b*, 208*c*, and 208*d* may carry RF signals between the top plate 204 of the raised antenna patch 202 and components (for example, the plurality of packaged circuitry 114) at second surface of the antenna substrate 110. The material of the raised antenna patch 202 may be copper, stainless steel, or any other conductive material. The raised antenna patch 202 may be formed by bending a substantially flat copper patch at the four supporting legs 208*a*, 208*b*, 208*c*, and 208*d*. The flat patch may have relief cuts between the four projections 206*a*, 206*b*, 206*c*, and 206*d* and the four supporting legs 208*a*, 208*b*, 208*c*, and 208*d* in order to facilitate bending supporting legs 208*a*, 208*b*, 208*c*, and 208*d* without bending top plate 204.

In accordance with an embodiment, the use of the 3-D antenna cell 200 in the 3-D antenna panel may result in improved matching conditions, scan range, and bandwidth. The improved matching conditions, scan range, and bandwidth are attributed to factors, such as the shape of the raised antenna patch 202 (for example, the projections 206*a*, 206*b*, 206*c*, and 206*d*), the use of air as dielectric to obtain the desired height of the raised antenna patch 202 at low cost, and shielding fence around the 3-D antenna cell 200.

In accordance with an embodiment, the raised antenna patch 202 uses air as a dielectric, instead of using solid material (such as FR4) as a dielectric, and thus may present several advantages. For example, air, unlike typical solid dielectrics, does not excite RF waves within the dielectric or on the surface thereof, and thus decreases power loss and increases efficiency. Moreover, since top plate 204 may have an increased height, the bandwidth of the raised antenna patch 202 with air dielectric may be significantly improved without increasing manufacturing cost. Furthermore, the use of air as the dielectric is free of cost, and may not result in formation of a waveguide since RF waves would not be trapped when air is used as the dielectric. In addition, the raised antenna patch 202 having the projections 206*a*, 206*b*, 206*c*, and 206*d* may provide improved matching with transmission lines, thereby, delivering power to the antenna over a wide range of scan angles, resulting in lower return loss.

Figure 3A:
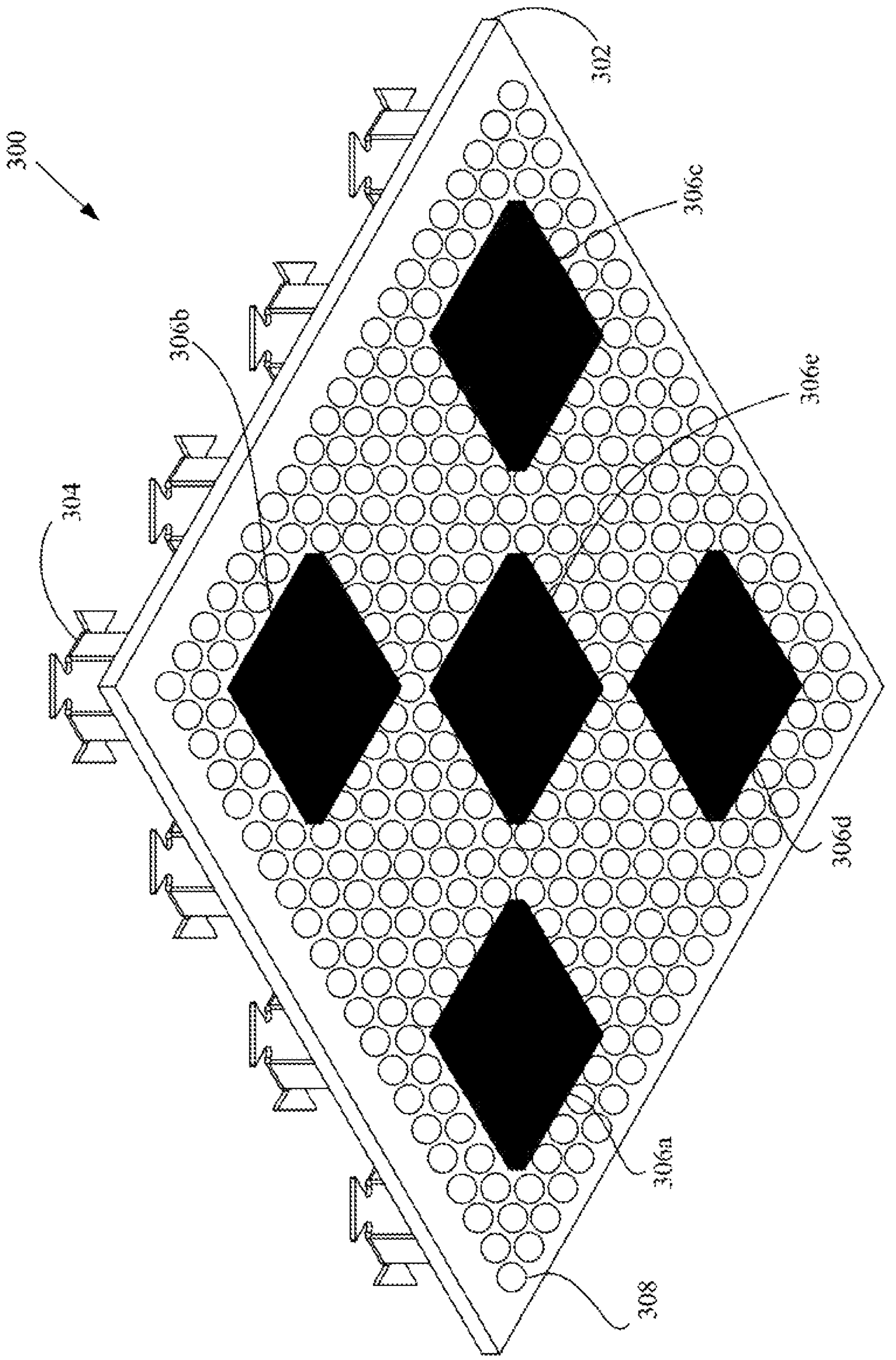
FIG. 3A illustrates a perspective view of an exemplary 3-D antenna array module, in accordance with an exemplary embodiment of the disclosure.

FIG. 3A illustrates a perspective view of an exemplary 3-D antenna array module, in accordance with an exemplary embodiment of the disclosure. With reference to FIG. 3A, there is shown an antenna module 300. The antenna module 300 may correspond to one of the plurality of antenna modules 106, such as the first antenna module 106*a*, as shown in FIG. 1. With reference to the antenna module 300, there is further shown an antenna substrate 302 that may generally correspond to the antenna substrate 110 of the first antenna module 106*a*, as shown in FIG. 1. There is further shown a plurality of 3-D antenna cells 304 that may generally correspond to the plurality of antenna cells 112 of the first antenna module 106*a*, as shown in FIG. 1. There is further shown a plurality of packaged circuitry, such as a first RF chip 306*a*, a second RF chip 306*b*, a third RF chip 306*c*, a fourth RF chip 306*d*, and a mixer chip 306*e*, that may generally correspond to the plurality of packaged circuitry 114 of the first antenna module 106*a*, as shown in FIG. 1. There is further shown a plurality of supporting balls 308 that may generally correspond to the plurality of supporting balls 116 of the first antenna module 106*a*, as shown in FIG. 1.

As shown in FIG. 3A, the plurality of 3-D antenna cells 304 may be mounted on an upper surface of the antenna substrate 302. A specified count of 3-D antenna cells from the plurality of 3-D antenna cells 304 may be connected with each of the first RF chip 306*a*, the second RF chip 306*b*, the third RF chip 306*c*, or the fourth RF chip 306*d*. Further, the plurality of 3-D antenna cells 304 may be connected with the mixer chip 306*e*. In another exemplary embodiment, at least one of the first RF chip 306*a*, the second RF chip 306*b*, the third RF chip 306*c*, or the fourth RF chip 306*d* may be connected with the mixer chip 306*e*. The first RF chip 306*a*, the second RF chip 306*b*, the third RF chip 306*c*, the fourth RF chip 306*d*, and the mixer chip 306*e* may be mounted on a lower surface of the antenna substrate 302, as shown. The lower surface of the antenna substrate 302 may further include the plurality of supporting balls 308 that are designed to maintain uniform space and support to the antenna module when the antenna module 300 is mounted on the PCB 102.

Figure 3B:
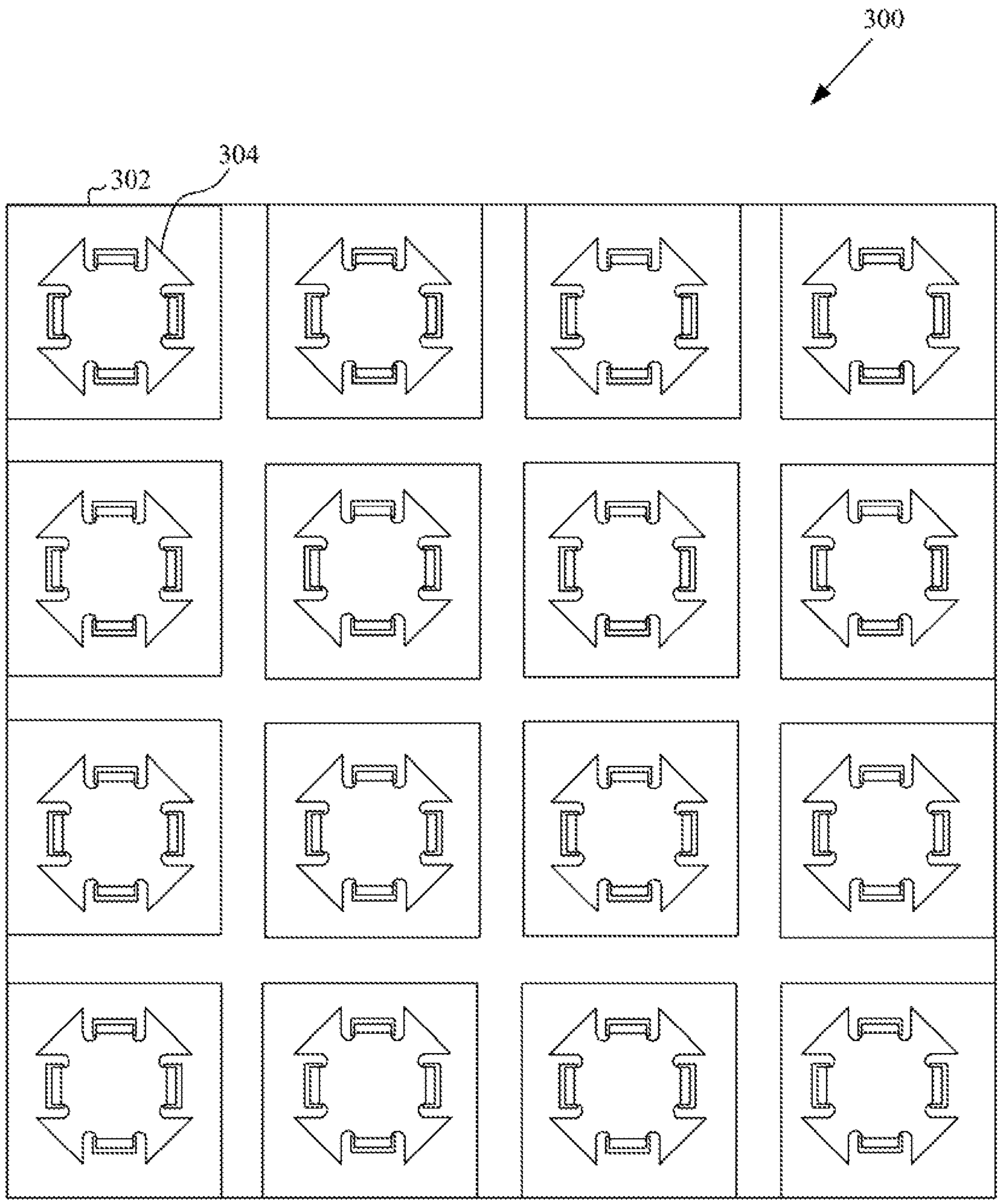
FIG. 3B illustrates a top view of an exemplary 3-D antenna array module, in accordance with an exemplary embodiment of the disclosure.

FIG. 3B illustrates a top view of the antenna module 300, in accordance with an exemplary embodiment of the disclosure. The antenna module 300 may correspond to a "4×4" array of the plurality of 3-D antenna cells 304. Each of the "4×4" array of the plurality of 3-D antenna cells 304 is mounted on the top surface of the antenna substrate.

Figure 3C:
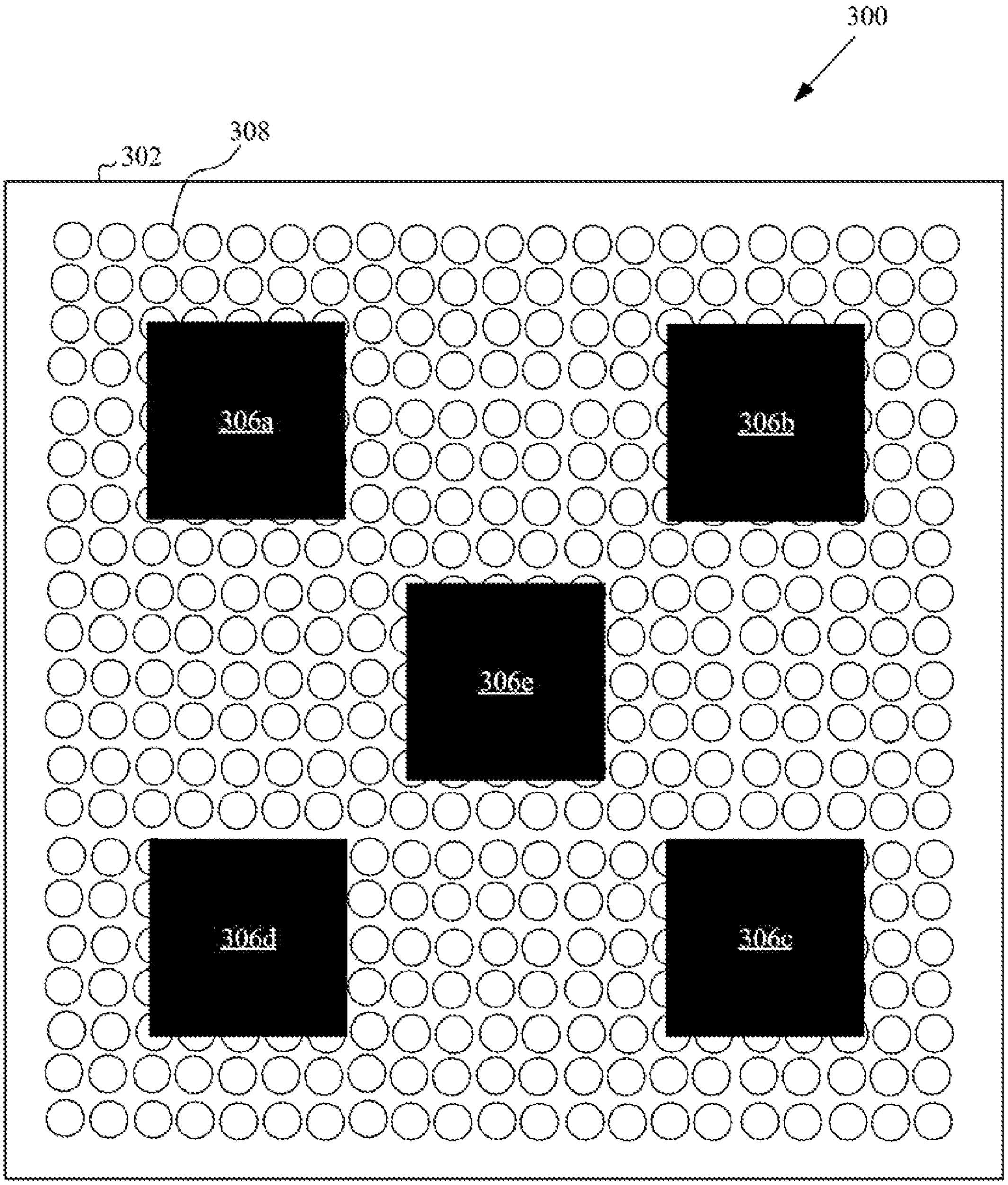
FIG. 3C illustrates a rear view of an exemplary 3-D antenna array module, in accordance with an exemplary embodiment of the disclosure.

FIG. 3C illustrates a rear view of the antenna module 300, in accordance with an exemplary embodiment of the disclosure. The first RF chip 306*a*, the second RF chip 306*b*, the third RF chip 306*c*, the fourth RF chip 306*d*, and the mixer chip 306*e* are mounted on the lower surface of the antenna substrate 302. Further, each of the "4×4" array of the plurality of 3-D antenna cells 304 is electrically connected with at least one of the first RF chip 306*a*, the second RF chip 306*b*, the third RF chip 306*c*, the fourth RF chip 306*d*, or the mixer chip 306*e*.

FIGS. 3A, 3B, and 3C show a 3-D antenna panel with one antenna module 300 having "4×4" array of the plurality of 3-D antenna cells 304 that include "16" 3-D antenna cells. However, a count of the 3-D antenna cells is for exemplary purposes and should not be construed to limit the scope of the disclosure. In practice, for example, when the 3-D antenna panel is used in conjunction with 5G wireless communications, the 3-D antenna panel may include "144" 3-D antennas cells. Therefore, "9" antenna modules of "4×4" array of the plurality of 3-D antenna cells 304 may be required. Furthermore, when the 3-D antenna panel is used in conjunction with commercial geostationary communication satellites or low earth orbit satellites, the 3-D antenna panel may be even larger, and have, for example, "400" 3-D antennas cells. Therefore, "25" antenna modules of "4×4" array of the plurality of 3-D antenna cells 304 may be required. In other examples, the 3-D antenna panel may have any other number of 3-D antenna cells. In general, the performance of the 3-D antenna panel improves with the number of 3-D antenna cells.

Figure 4:
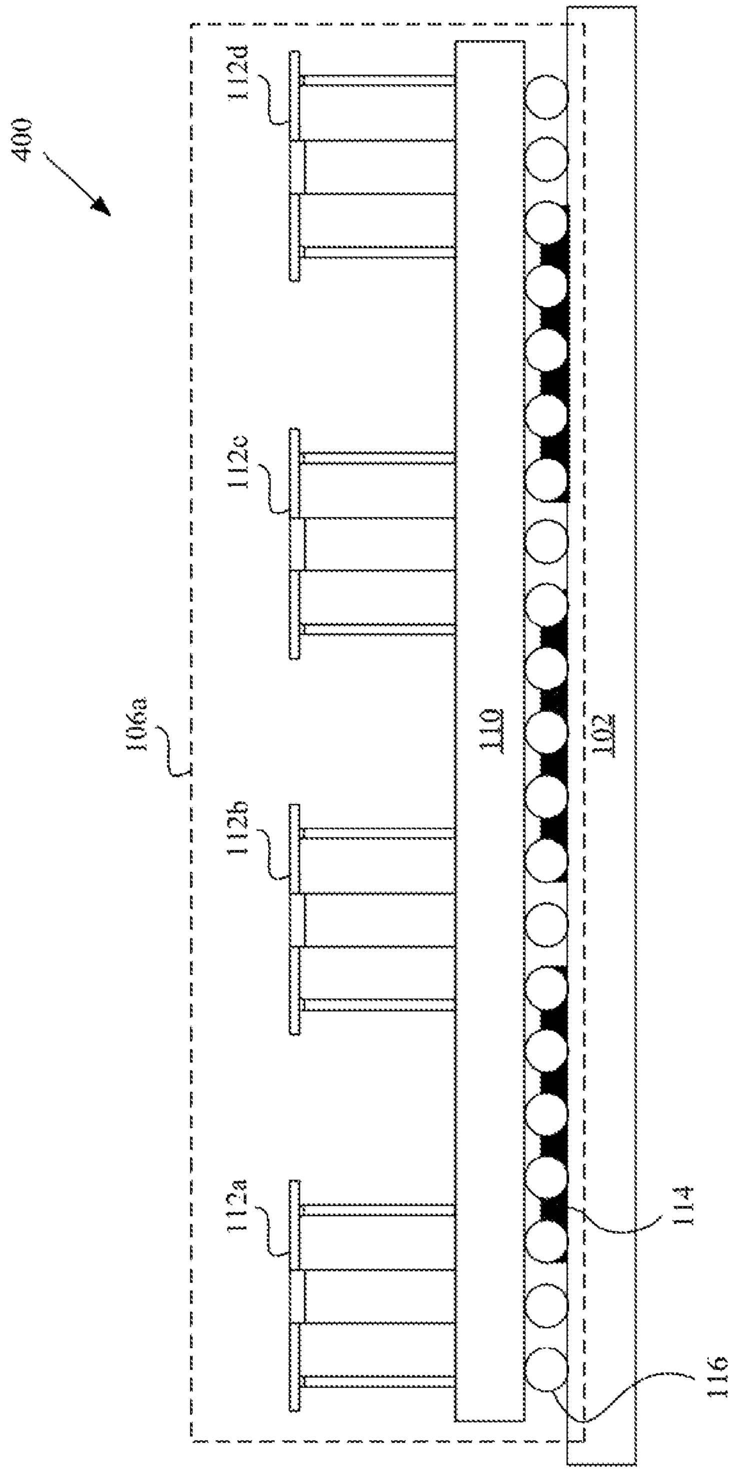
FIG. 4 illustrates a side view arrangement of antenna cells of a 3-D antenna array module on a PCB, in accordance with an exemplary embodiment of the disclosure.

FIG. 4 illustrates a side view arrangement of antenna cells of a 3-D antenna module on a PCB, in accordance with an exemplary embodiment of the disclosure. With reference to FIG. 4, there is shown a side view arrangement 400 that is described in conjunction with FIGS. 1, 2, and 3A to 3C. The side view arrangement 400 corresponds to side view integration of the plurality of 3-D antenna cells 112 on a first surface (i.e., a top surface) of the antenna substrate 110 of the first antenna module 106*a*. The plurality of 3-D antenna cells 112 may be electrically (or magnetically) connected with the plurality of packaged circuitry 114 (i.e., the RF and mixer chips 306). The RF and mixer chips 306 may be integrated with a second surface (i.e., a bottom surface) of the antenna substrate 110. Further, the first antenna module 106*a* is integrated on the PCB 102 via the plurality of packaged circuitry 114 and the plurality of supporting balls 116. The plurality of 3-D antenna cells 112 may result in improved bandwidth. Further, the use of the plurality of 3-D antenna cells 112, as shown in FIG. 4, may provide improved matching with transmission lines, thereby, delivering power to the first antenna module 106*a* over a wide range of scan angles, resulting in lower return loss. The 3-D antenna module may facilitate the integration of the chips and the antenna cells as single package implementation. The 3-D antenna modules simplify the design of 5G RFFE and enhance the flexibility to extend. The antenna impedance matching is improved resulting in reduced return loss. In PCB 102, as the signals are low frequency, therefore generic substrates (such as organic based material) may be utilized instead of expensive substrate, thereby saving the overall cost for realization. The 3-D antenna modules may further attract the users to design customized front end system.

Thus, various implementations of the present application achieve improved large scale integration of 3-D antenna panels for use in 5G applications. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. An apparatus, comprising:

a plurality of antenna modules; and a printed circuit board (PCB) having a plurality of holes embedded with a heat sink, wherein each antenna module of the plurality of antenna modules comprises:

an antenna substrate;

a plurality of three-dimensional (3-D) antenna cells mounted on a first surface of the antenna substrate; and a plurality of packaged circuitry mounted on a second surface of the antenna substrate, wherein the plurality of packaged circuitry are electrically connected with the plurality of 3-D antenna cells, wherein each antenna module of the plurality of antenna modules is mounted within a respective hole of the plurality of holes such that a corresponding packaged circuitry of the plurality of packaged circuitry is in a direct contact with the heat sink.

2. The apparatus according to claim 1, wherein each antenna module of the plurality of antenna modules further comprises a plurality of supporting balls mounted on the second surface of the antenna substrate.

3. The apparatus according to claim 2, wherein the plurality of supporting balls are mounted on the second surface of the antenna substrate such that a uniform space and support is maintained between each antenna module of the plurality of antenna modules and the printed circuit board (PCB) when each antenna module is mounted on the PCB.

4. The apparatus according to claim 1, wherein each of the plurality of 3-D antenna cells is a 3-D metal stamped antenna configured for millimeter wave (mmWave) wireless communication.

5. The apparatus according to claim 1, wherein a height of each of the plurality of 3-D antenna cells is one-fourth of wavelength at an operational frequency, and wherein a width of each of the plurality of 3-D antenna cells is half of the wavelength at the operational frequency.

6. The apparatus according to claim 1, wherein a distance between two 3-D antenna cells of the plurality of 3-D antenna cells is half of wavelength at an operational millimeter wave (mmWave) frequency.

7. The apparatus according to claim 1, wherein each of the plurality of 3-D antenna cells comprises a raised antenna patch with air dielectric.

8. The apparatus according to claim 7, wherein the raised antenna patch comprises a top plate over a ground plane in each of the plurality of 3-D antenna cells.

9. The apparatus according to claim 7, wherein the raised antenna patch comprises four projections having outwardly increasing widths.

10. The apparatus according to claim 7, wherein the raised antenna patch comprises a top plate at a height greater than a ground plane in each of the plurality of 3-D antenna cells.

11. The apparatus according to claim 1, wherein each of the plurality of 3-D antenna cells further comprises four supporting legs.

12. The apparatus according to claim 11, wherein each of the four supporting legs is located between a pair of adjacent projections of four projections associated with a raised antenna patch of each of the plurality of 3-D antenna cells.

13. The apparatus according to claim 1, further comprises a first supporting ball on a first side of a packaged circuitry of the plurality of packaged circuitry and a second supporting ball on a second side of the packaged circuitry on the second surface of the antenna substrate.

14. The apparatus according to claim 1, wherein the plurality of packaged circuitry comprises a plurality of radio-frequency (RF) chips and at least one mixer chip that are mounted on a second surface of the antenna substrate.

15. The apparatus according to claim 14, wherein the plurality of packaged circuitry is further mounted on a printed circuit board (PCB) based on the plurality of holes in the PCB.

16. The apparatus according to claim 1, wherein the plurality of packaged circuitry of each antenna module comprises a first radio-frequency (RF) chip, a second RF chip, a third RF chip, and a fourth RF chip, and at least one mixer chip that are mounted on a second surface of the antenna substrate.

17. The apparatus according to claim 16, wherein a specified count of 3-D antenna cells from the plurality of 3-D antenna cells is connected with each of the first RF chip, the second RF chip, the third RF chip, and the fourth RF chip.

18. The apparatus according to claim 16, wherein at least one of the first RF chip, the second RF chip, the third RF chip, or the fourth RF chip is connected with the mixer chip.

19. The apparatus according to claim 1, wherein each antenna module of the plurality of antenna modules is mounted on the plurality of holes via a corresponding packaged circuitry of the plurality of packaged circuitry.

20. The apparatus according to claim 1, wherein the first surface of the PCB and a plurality of portions of the heat sink embedded within the plurality of holes forms a mounting surface of the PCB on which the plurality of antenna modules are mounted.

* * * * *